US012578792B1

(12) United States Patent
Kwon et al.

(10) Patent No.: US 12,578,792 B1
(45) Date of Patent: Mar. 17, 2026

(54) METHOD AND APPARATUS FOR REAL-TIME EYE TRACKING OF KIOSK USERAND BY PERFORMING INFERENCE ON CALIBRATION MODEL

(71) Applicant: KOREA ELECTRONICS TECHNOLOGY INSTITUTE, Seongnam-si (KR)

(72) Inventors: Yong-Hoon Kwon, Seongnam-si (KR); Ju Hong Yoon, Hwaseong-si (KR); Min-Gyu Park, Seoul (KR); Je Woo Kim, Seongnam-si (KR); Ye Jin Hyeong, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 18/990,965

(22) Filed: Dec. 20, 2024

(30) Foreign Application Priority Data

Nov. 19, 2024 (KR) ........................ 10-2024-0164969

(51) Int. Cl.
G06F 3/01 (2006.01)
G06F 3/0482 (2013.01)
(Continued)

(52) U.S. Cl.
CPC ............ G06F 3/013 (2013.01); G06F 3/0488 (2013.01); G06F 3/0482 (2013.01); G06Q 20/18 (2013.01)

(58) Field of Classification Search
CPC ...... G06F 3/013; G06F 3/0488; G06F 3/0482; G06Q 20/18
See application file for complete search history.

(56) References Cited

U.S. PATENT DOCUMENTS 10,990,996 B1 * 4/2021 Podgorny .......... G06Q 30/0218
2011/0254865 A1 * 10/2011 Yee ..................... G06F 3/04886
345/661

(Continued)

FOREIGN PATENT DOCUMENTS

KR     10-2019-0113252 A1     10/2019
KR          10-2426071 B1      7/2022
KR     10-2023-0166292 A1     12/2023

OTHER PUBLICATIONS

Office Action in corresponding KR 10-2024-0164969 dated Nov. 3, 2025.

*Primary Examiner* — David D Davis
(74) *Attorney, Agent, or Firm* — Knobbe, Martens, Olson & Bear, LLP

(57) ABSTRACT

Proposed are a method and apparatus including real-time eye tracking and calibration functions in a kiosk including a display. The method may include collecting first data related to a user's appearance based on image data on the user acquired from a camera of the kiosk, and generating first screen coordinates of the display corresponding to the user's eyes based on the first data and performing eye tracking on the user. The method may also include collecting second data including second screen coordinates for a corresponding touch point detected when the user touches and selects a menu displayed on the display and training a calibration machine learning model using the collected second data, and performing inference on the calibration model using the first screen coordinates according to the eye tracking performed at a time other than the touch selection time point to perform calibration on the eye tracking.

12 Claims, 4 Drawing Sheets

S310
COLLECT FIRST DATA
BASED ON IMAGE DATA

S320
PERFORM EYE TRACKING USING FIRST MODEL BASED ON COLLECTED FIRST DATA

S330
TRAIN SECOND MODEL USING SECOND DATA ACCORDING TO TOUCH INPUT OF USER

S340
PERFORM CALIBRATION ON EYE TRACKING USING TRAINED SECOND MODEL

S350
PROVIDE CUSTOMIZED USER INTERFACE

(51) Int. Cl.
　　*G06F 3/0488*　　　　(2022.01)
　　*G06Q 20/18*　　　　(2012.01)

(56)　　　　　　　References Cited

U.S. PATENT DOCUMENTS

| | | | |
|---|---|---|---|
| 2014/0320397 A1* | 10/2014 | Hennessey | G06F 3/013 |
| | | | 345/156 |
| 2016/0093136 A1* | 3/2016 | Lyons | G07F 17/3237 |
| | | | 463/31 |
| 2017/0154369 A1* | 6/2017 | Yu | G06Q 30/06 |
| 2020/0326774 A1* | 10/2020 | Hong | G06T 11/60 |
| 2022/0310094 A1* | 9/2022 | Nguyen | G06F 18/251 |
| 2023/0368323 A1* | 11/2023 | Komagome | G06Q 20/3274 |

\* cited by examiner

110

120

100

FIRST DATA → FIRST MODEL → FIRST SCREEN COORDINATES

SECOND SCREEN COORDINATES ← SECOND MODEL ←

METHOD AND APPARATUS FOR REAL-TIME EYE TRACKING OF KIOSK USER AND BY PERFORMING INFERENCE ON CALIBRATION MODEL

CROSS-REFERENCE TO RELATED APPLICATION

This application claims priority to and the benefit of Korean Patent Application No. 10-2024-0164969, filed on Nov. 19, 2024, the disclosure of which is incorporated herein by reference in its entirety.

BACKGROUND

Technical Field

This application relates to a kiosk technology, and more specifically, to a kiosk technology including real-time eye tracking and calibration functions.

Description of Related Art

For a user interface in various terminals, an eye tracking function for a user and a calibration function for calibrating the result of the corresponding eye tracking may each be performed. These eye tracking and calibration functions correspond to essential functions required to provide services provided from the corresponding terminal more smoothly based on the user interface.

Meanwhile, a kiosk is not a personal terminal but a public terminal used by multiple users. Accordingly, the following problems may occur in conventional kiosks (hereinafter referred to as "the related art") that adapt and use eye tracking and calibration functions.

<Problem 1: Complexity>

First, to apply eye tracking and calibration functions to a kiosk, a separate calibration process needs to be performed. Such a separate calibration process corresponds to a complex process in which a separate action of the user needs to be additionally performed in addition to an action of the user purchasing a ticket or placing an order using the kiosk (hereinafter referred to as "a required action").

That is, in the case of the related art, a calibration process including a separate action such as aligning the user's eyes with various specific positions on a kiosk screen before using the kiosk according to the required action needs to be performed. Since such a calibration process additionally requires separate actions that are not a required action for the kiosk, it is not only complicated and cumbersome for the user, but also inconvenient because the corresponding process needs to be performed separately for each user.

<Problem 2: Time Consumption>

From the user's perspective, it is important to quickly input desired information into the kiosk according to the required action and obtain a desired result (e.g., the result of receiving a ticket, the result of completing an order, etc.). However, in the related art, the above-described separate calibration process is a task that consumes a considerable amount of time, resulting in an unnecessary waiting time until the corresponding result is obtained.

<Problem 3: Lack of Customized User Experience>

However, in the related art, since the same type of interface is provided to all users even after the above-described separate calibration process is completed, there is the limitation that a customized interface cannot be provided to each user. In particular, although each user has different physical characteristics, standing positions, facial postures, or the like, the related art cannot provide optimal eye tracking suitable for each user. This is because the related art tends to continuously use set calibration values, and thus an eye position cannot be flexibly reflected according to the corresponding user. Accordingly, the related art cannot provide a customized experience to the user due to low accuracy for eye tracking, which can lower the usability of the kiosk for the user.

<Problem 4: Limited Accessibility>

The above-described separate calibration process is not easy for those who are not familiar with the corresponding process. In particular, since the kiosk is a device accessed by various users of various ages and skill levels, it is essential to have a technology that all users can easily access and use, but the related art cannot meet such requirements, which limits accessibility.

In conclusion, since the eye tracking and calibration functions applied to the related art not only require a separate complicated process and much time from the user, but also cannot sufficiently consider a number of external factors necessary for precise tracking, there are many limitations in case of use and accuracy. Accordingly, the user cannot smoothly use the kiosk, or the user experience can be significantly lowered due to incorrect settings in the above-described separate calibration process.

However, the above-described content merely provides background information on the present disclosure and does not correspond to previously disclosed technology.

BRIEF SUMMARY

The present disclosure is directed to providing a kiosk technology including real-time eye tracking and calibration functions and is directed to providing a kiosk technology that is capable of being user-friendly, minimizing the inconvenience of a calibration process, and continuously providing accurate real-time eye tracking.

However, objects of the present disclosure are not limited to the above object, and other objects that are not mentioned will be able to be clearly understood by those skilled in the art to which the present disclosure pertains from the following description.

According to an aspect of the present disclosure, there is provided a method performed by a kiosk including a display having a touch screen, which includes collecting first data related to a user's appearance based on image data on the user acquired from a camera of the kiosk, generating first screen coordinates of the display corresponding to the user's eyes based on the first data and performing eye tracking on the user, collecting second data including second screen coordinates for a corresponding touch point detected when the user touches and selects a menu displayed on the display and training a calibration model, which is a machine learning model, using the collected second data, and performing inference on the calibration model using the first screen coordinates according to the eye tracking performed at a time other than the touch selection time point to perform calibration on the eye tracking.

The first data may include data on a position, facial pose, and distance of the user.

The performing of the eye tracking may be performed using an eye tracking model, which is a machine learning model, and when the first data is input, the eye tracking model may be a model trained to output the first screen coordinates corresponding to the first data.

When the first screen coordinates are input, the calibration model may be a model trained to output the second screen coordinates, which are a result of calibrating the first screen coordinates.

The training of the calibration model may include collecting the second data according to touch selection performed upon a required action in which the user purchases a ticket or places an order using the kiosk.

The required action may include an initial selection action in which the user who intends to use the kiosk initially selects an initial menu displayed on the display.

The required action may include the initial selection action and an intermediate selection action in which the user selects detailed menus displayed on the display to select detailed items of a desired ticket or order after the initial selection action.

The training of the calibration model may include gradually training the calibration model using a plurality of pieces of second data collected according to touch selections on a plurality of menus.

The method according to one embodiment of the present disclosure may further include providing a customized interface for the user through the display using the calibrated second screen coordinates.

The customized interface may provide functions of analyzing eye information of the user according to the calibrated second screen coordinates and adjusting or recommending a screen interface.

According to another aspect of the present disclosure, there is provided an apparatus related to a kiosk, which includes a camera configured to acquire image data on a user who uses the kiosk, a display having a touch screen, and a controller configured to provide a function of the kiosk using the image data.

The controller may be configured to collect first data related to the user's appearance based on the image data, generate first screen coordinates of the display corresponding to the user's eyes based on the first data and perform eye tracking on the user, collect second data including second screen coordinates for a corresponding touch point detected when the user touches and selects a menu displayed on the display and train a calibration model, which is a machine learning model, using the collected second data, and perform inference on the calibration model using the first screen coordinates according to the eye tracking performed at a time other than the touch selection time point to perform calibration on the eye tracking.

The controller may use the first data including data on a position, facial pose, and distance of the user.

When receiving the first data, the controller may perform the eye tracking using an eye tracking model, which is a machine learning model trained to output the first screen coordinates corresponding to the first data.

When receiving the first screen coordinates, the controller may use the calibration model trained to output the second screen coordinates, which are a result of calibrating the first screen coordinates.

The controller may collect the second data according to touch selection performed upon a required action in which the user purchases a ticket or places an order using the kiosk when performing the calibration.

The required action may include an initial selection action in which the user who intends to use the kiosk initially selects an initial menu displayed on the display.

The required action may include an initial selection action and an intermediate selection action in which the user selects detailed menus displayed on the display to select detailed items of a desired ticket or order after the initial selection action.

The controller may gradually train the calibration model using a plurality of pieces of second data collected according to touch selections for a plurality of menus.

The controller may provide a customized interface for the user through the display using the calibrated second screen coordinates.

The controller may provide the customized interface by providing functions of analyzing eye information of the user according to the calibrated second screen coordinates and adjusting or recommending a screen interface.

The present disclosure has been researched under support of National Research and Development Project, and specific information of National Research and Development Project is as follow:

[Project Unique Number] 2710008585
[Project Number] II220608 (2022-0-00608)
[Ministry] Ministry of Science and ICT
[Project Management (Specialized) Agency Name] National IT Industry Promotion Agency
[Research Project Name] Development of Core Source Technology for Human-Centered Artificial Intelligence
[Research Project Name] (1st Subsection) Multimodal Interaction Artificial Intelligence Technology for Human Communication
[Project Executing Agency Name] Korea Electronics Technology Institute
[Research Period] 2024.01.01~2024.12.31

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

BRIEF DESCRIPTION OF THE SEVERAL VIEWS OF THE DRAWINGS

Figure 1:
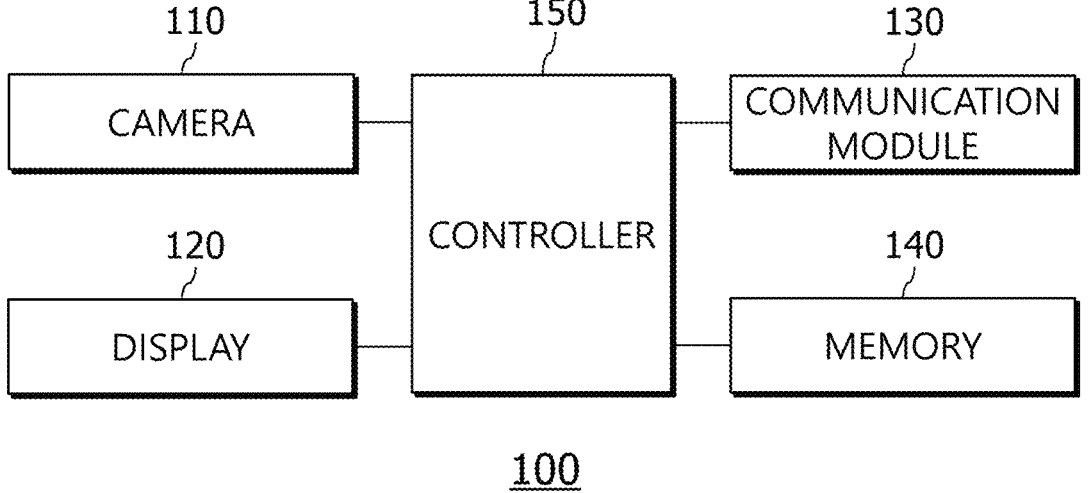
FIG. 1 illustrates a block diagram of an apparatus (100) according to one embodiment of the present disclosure.

The above objects, means, and effects of the present disclosure will become more apparent through the following detailed description with reference to the accompanying drawings, and thus those skilled in the art to which the present disclosure pertains will be able to easily carry out the technical idea of the present disclosure. In addition, in describing the present disclosure, when it is determined that detailed description of the known technology related to the present disclosure may unnecessarily obscure the gist of the present disclosure, a detailed description thereof will be omitted.

Terms used in the specification are for describing the embodiments and are not intended to limit the present disclosure. In the present specification, the singular form also includes the plural form unless specifically stated in the phrase. As used herein, terms such as "comprises,"

"includes," "provides," "has," etc. do not preclude the presence of addition of one or more other components other than the stated components.

In the present specification, terms such as "or," "at least one," etc. may refer to one of the words listed together or refer to a combination of two or more. For example, "A or B," "at least one of A and B" may include only one of A or B or include both A and B.

In the present specification, in the description according to "for example" or the like, presented information such as cited characteristics, variables, or values may not be exactly the same, and embodiments of the invention according to various embodiments of the present disclosure should not be limited due to effects such as modifications in addition to tolerances, measurement errors, and limits of measurement accuracy and other commonly known factors.

In the present specification, when a certain component is described as being "connected" or "coupled" to another component, it should be understood that the certain component may be directly connected or coupled to the other component or another component may be present therebetween. On the other hand, when a certain component is described as being "directly connected" or "directly coupled" to another component, it should be understood that another component is not present therebetween.

In the present specification, when a certain component is described as being "on" or "in contact with" another component, it should be understood that the certain component may be in direct contact with or connected to the other component but another component may be present therebetween. On the other hand, when a certain component is described as being "directly on" or "in direct contact with" another component, it can be understood that still another component is not present therebetween. Other expressions that describe a relationship between components, such as "between," "directly between," etc. can also be construed similarly.

In the present specification, terms such as "first," "second," etc. may be used to describe various components, but the corresponding components should not be limited by the terms. In addition, the above terms should not be construed as limiting the order of each component, and may be used to distinguish one component from another component. For example, "a first component" may be referred to as a "second component," and similarly, the "second component" may also be referred to as the "first component."

Unless otherwise defined, all terms (including technical and scientific terms) used in the present specification may be used as meanings commonly understood by those skilled in the art to which the present disclosure pertains. In addition, terms defined in commonly used dictionaries are not interpreted ideally or excessively unless clearly and specially defined.

Hereinafter, exemplary embodiments according to the present disclosure will be described in detail with reference to the accompanying drawings.

Figure 2:
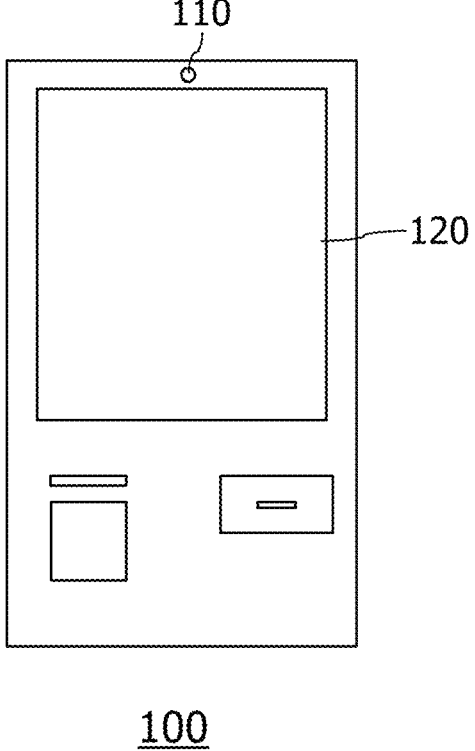
FIG. 2 illustrates an example of the apparatus (100) according to one embodiment of the present disclosure.

FIG. 1 illustrates a block diagram of an apparatus 100 according to one embodiment of the present disclosure, and FIG. 2 illustrates an example of the apparatus 100 according to one embodiment of the present disclosure.

The apparatus 100 according to one embodiment of the present disclosure (hereinafter referred to as "the apparatus") corresponds to a kiosk that a user uses to purchase a ticket or place an order. The apparatus 100 may perform real-time eye tracking and calibration functions (hereinafter referred to as "a first function"). In addition, the apparatus 100 may perform a function (hereinafter referred to as "a second function") of providing a customized interface to a user using the real-time eye tracking result of the user for whom calibration has been performed according to the first function).

That is, the apparatus 100 is a kiosk that performs computing for the first and second functions or the like and may include a camera 110, a display 120, a memory 140, and a controller 150 as illustrated in FIGS. 1 and 2. Of course, the apparatus 100 may further include a communication module 130.

In particular, the user's action using the kiosk, which is the apparatus 100 to purchase a ticket, place an order, or the like is referred to as a "required action." That is, the required action corresponds to an action for the user to use the kiosk according to the purpose of the kiosk. Accordingly, the required action may include an action in which the user touches and selects a menu displayed on the display 120 implemented as a touch screen to purchase a ticket, place an order, or the like. In this case, the user performs the required action of selecting multiple menus for the final selection. That is, the required action until the final selection in which the user obtains a desired result (e.g., a result of receiving a ticket, a result of completing an order, etc.) using the apparatus 100 may include an action in which the user selects multiple menus on the display 120.

Specifically, the required action may include an initial selection action and additionally include an intermediate selection action or a final selection operation. In this case, the initial selection action is an action in which the user who intends to use the apparatus 100 selects an initial menu initially displayed on the display 120. For example, the initial menu may include a menu that allows the user to select the intent to use the apparatus 100 or the like.

The intermediate selection action is an action to select a detailed menu displayed on the display 120 so that the user may select detailed items such as a desired ticket or order after the initial selection action. For example, in the case of purchasing a ticket, the detailed menu may include a menu that allows the user to select the type of ticket, the number of tickets, and the like. In the case of placing an order, the detailed menu may include a menu that allows the user to select the type of order, the number of orders, and the like.

The final selection action is an action to select a final menu displayed on the display 120 so that the user may finally select the ticket, order, or the like selected according to the intermediate selection action and pay or cancel the same. For example, the final menu may include a menu that allows the user to select whether to make a final selection, the type of payment (i.e., select card payment, cash payment, etc.).

Meanwhile, in the related art, in addition to these required actions, a separate calibration process that requires a separate action of the user needs to be performed. Accordingly, the related art inevitably causes the above-described problems 1 to 4 and the like. For example, a separate action may be an action where the user gazes at various specific positions on the kiosk screen before using the kiosk according to the required action.

To solve the above problems of the related art, the apparatus 100 and a method described below provide a kiosk technology of performing the first function (i.e., the eye tracking and calibration functions) in real time during the user's required action without performing a separate action unlike the related art. In particular, a required action in which the user selects various menus multiple times until the user's final selection is performed, and the apparatus 100 and the method described below perform a process of continuously improving the accuracy of the calibration function among these required actions. Accordingly, the apparatus 100 and the method described below have the advantages of being user-friendly, minimizing the inconvenience of the calibration process, and continuously providing accurate real-time eye tracking.

The camera 110 captures an image of the user in a front direction of the apparatus 100 to use the apparatus 100. In this case, the front direction of the apparatus 100 corresponds to a direction in which the display 120 is exposed to the outside. For example, the camera 110 may be an optical camera for capturing a two-dimensional optical image in the front direction of the user. In this case, the optical image captured by the camera 110 may include color information (e.g., RGB information, etc.) of each pixel for the corresponding two-dimensional optical image.

The display 120 displays image data to the user and may be configured as a non-luminous panel or a luminous panel. For example, a menu for the required action such as purchasing a ticket or placing an order may be provided to the user through the display 120. For example, the menu may include an initial menu, a detailed menu, a final menu, or the like, and descriptions thereof are as described above. Of course, the display 120 is implemented as a touch screen or the like so that an input through a user touch such as a pressure-sensitive, electrostatic type, etc. is possible. To this end, the display 120 may include a touch sensor for implementing a touch screen.

For example, the display 120 may include a liquid crystal display (LCD) panel, a light emitting diode (LED) display panel, an organic LED (OLED) display panel, a quantum dot light emitting diode (QLED) display panel, a micro electro mechanical systems (MEMS) display panel, an electronic paper display panel, a hologram display panel, or the like, but is not limited thereto.

The communication module 130 is a component for communicating with other devices. That is, the communication module 130 may communicate with a management terminal, a server, and the like. For example, when the user purchases a ticket, completes an order, or the like through the apparatus 100, the corresponding information may be transmitted to the management terminal, the server, or the like.

For example, the communication module 130 may perform wireless communication such as cellular communication, LoRa communication, SigFox communication, 5G communication, long term evolution-advanced (LTE-A), long term evolution (LTE), Wi-Fi communication, Bluetooth, etc. or perform wired communication using a unshielded twisted pair cable (UTP), a coaxial cable, an optical cable, a hybrid fiber coax (HFC) cable, etc., but is not limited thereto.

The memory 140 stores various types of data required for operating the apparatus 100. For example, the memory 140 may store data transmitted and received to/from other devices through the communication module 130, data for performing the first and second functions and the like, data for the control operation of the controller 150, data of a program related to the method described below, and the like.

For example, the memory 140 may include volatile memory devices such as a DRAM, an SRAM, etc., non-volatile memory devices such as a PRAM, an MRAM, a ReRAM, a NAND flash memory, etc., a hard disk drive (HDD), a solid state drive (SSD), etc., but is not limited thereto. In addition, the memory 140 may include a cache, a buffer, a main memory, an auxiliary memory, or the like depending on its purpose/position, but is not limited thereto.

The controller 150 may perform various control operations for the apparatus 100. In particular, the controller 150 may control the execution of the first and second functions and the like. Of course, the controller 150 may control the execution of the method described below and control the operations of the remaining components of the apparatus 100, that is, the camera 110, the display 120, the communication module 130, the memory 140, and the like.

The controller 150 may include a hardware processor, a software process executed by the corresponding processor, or the like. For example, the processor may include a microprocessor, a micro controller unit (MCU), a central processing unit (CPU), a processor core, a multiprocessor, an application-specific integrated circuit (ASIC), a field programmable gate array (FPGA), or the like, but is not limited thereto.

Hereinafter, a method according to one embodiment of the present disclosure will be described in more detail.

Figure 3:
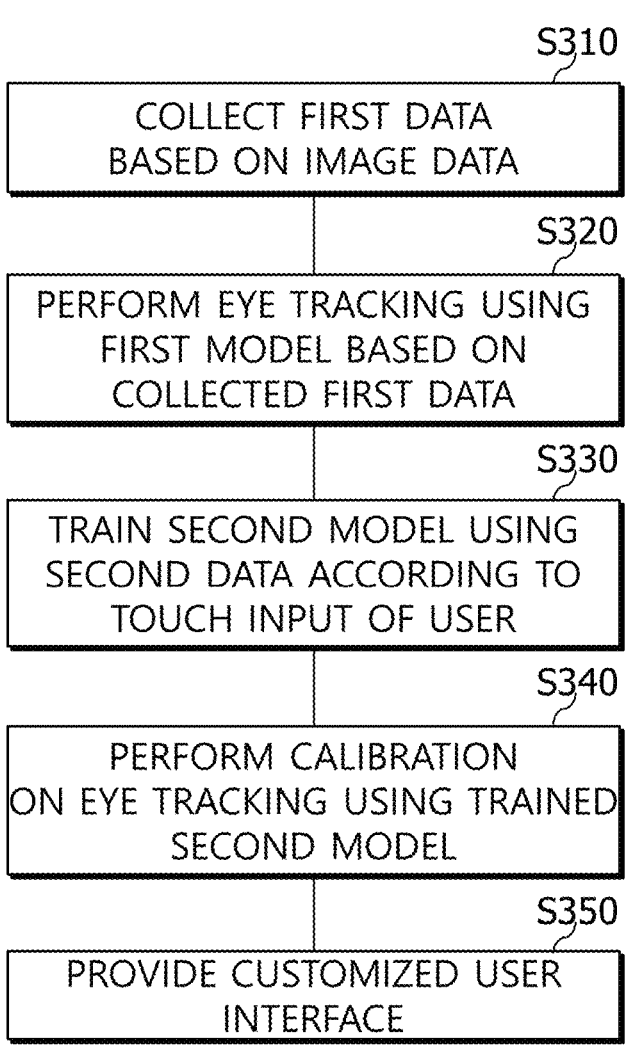
FIG. 3 illustrates a flowchart of a method according to one embodiment of the present disclosure.

FIG. 3 illustrates a flowchart of a method according to one embodiment of the present disclosure.

The method according to one embodiment of the present disclosure (hereinafter referred to as "the present method") is a method performed under the control of the controller 150 of the apparatus 100 and may include operations S310 to S350 as illustrated in FIG. 3. The execution of operations S310 to S350 may be processed by a processor of the controller 150. In this case, operations S310 to S340 are operations related to the first function, and operation S350 is an operation related to the second function. In particular, operations S310 and S320 are operations related to the eye tracking function, and operations S330 and S340 are operations related to the calibration function. Of course, operations S310 to S340 may correspond to operations that are necessarily performed, and operation S330 may correspond to an operation that is optionally performed, but the present disclosure is not limited thereto.

In operation S310, the controller 150 collects first data based on image data on the user captured by the camera 110. In this case, the first data is data necessary for tracking the eye of the user and is data related to the user's appearance (in particular, facial appearance, etc.) collected from the image data on the user.

For example, the first data may include data on a position, facial pose, and distance of the user. That is, the first data includes data that may distinguish physical differences of the user from the image data. In this case, the user's position corresponds to data on the position of the user's face in the image (i.e., the image data) captured by the camera 110. The facial pose corresponds to data on the facial pose of the user according to the shape and position of facial organs (e.g., eyes, nose, mouth, etc.) of the user in the image captured by the camera 110. In particular, the facial pose may include data on a direction in which the user's eyes are looking (i.e., data on a direction of the pupil). The distance corresponds to data on a degree to which the user's face is spaced apart from the apparatus 100. The first data may be collected using various image processing techniques such as object detection for images captured by the camera 110.

Figure 4:
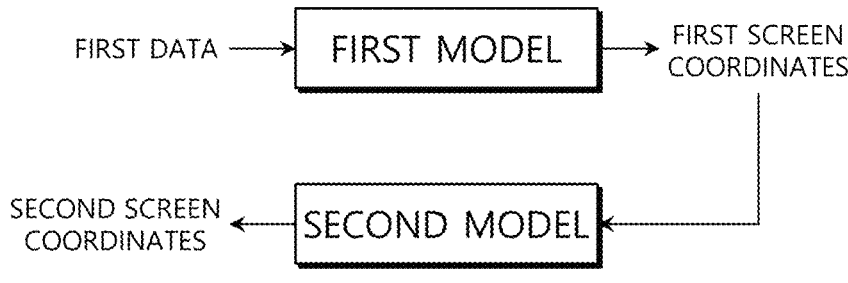
FIG. 4 illustrates a process of performing eye tracking and calibration on the corresponding eye tracking using first and second models.

FIG. 4 illustrates a process of performing eye tracking and calibration on the corresponding eye tracking using first and second models.

In operation S320, the controller 150 performs eye tracking based on the first data collected in operation S310. In this case, the eye tracking may mean generating first screen coordinates from the first data. The first screen coordinates are screen coordinates corresponding to the user's eyes in the image data captured by the camera 110 and correspond to screen coordinates of the display 120 of the apparatus 100. That is, the first screen coordinates correspond to data on which position in a region of the display 120 the user's eyes in the image data captured by the camera 110 are directed and may be generated using the first data collected in operation S310.

Of course, the controller 150 may control the display 120 to output the first screen coordinates from the first data using a first model. The first model may be referred to differently as an "eye tracking model." In this case, the first model may correspond to a machine learning model that has been previously trained according to a machine learning technique of supervised learning. In this case, the first model may be previously trained using first training data.

The first training data is data for training the first model and includes a pair of input data and output data. The input data of the first training data includes first data for training about the corresponding user collected from image data on various users. In addition, the output data of the first training data includes data on the first screen coordinates for training, which are labeled in response to the eyes of the corresponding user as a label for the corresponding input data.

As training according to the machine learning technique is performed using the first training data, the first model has a function for a relationship between the input data and the output data of the first training data and represents the corresponding function using various parameters. That is, the first model may represent a relationship between the first data for training (i.e., the input data of the first training data) and the first screen coordinates for training (i.e., the output data of the first training data) using parameters of weights and biases.

For example, the machine learning technique applied to train the first model may include an artificial neural network, boosting, Bayesian statistics, a decision tree, Gaussian process regression, a nearest neighbor algorithm, a support vector machine, a random forest, symbolic machine learning, ensembles of classifiers, deep learning, or the like, but is not limited thereto.

In particular, the first model may be a deep learning model trained by a deep learning technique. In this case, the first model represents a relationship between the input data and the output data of the training data as multiple layers, and the multiple representation layers are also referred to as a "neural network." That is, the model may represent the relationship between the input data and the output data of the training data through parameters of multiple hidden layers.

For example, the deep learning technique may include a deep neural network (DNN), a convolutional neural network (CNN), a recurrent neural network (RNN), a restricted Boltzmann machine (RBM), a deep belief network (DBN), a deep Q-network, and the like, but is not limited thereto.

As described above, the trained first model may be previously stored in the memory 140 and used to perform inference when performing operation S320. When performing such inference, the input data including the first data on the image data captured by the camera 110 collected in operation S310 is input to the first model, and as a result, a predicted value of the first screen coordinates for the corresponding first data is output from the first model.

Of course, operations S310 and S320 are performed on a user using the apparatus 100 based on the image data captured by the camera 110, and in this case, a plurality of pieces of image data on the user may be captured over time. Accordingly, when operations S310 and S320 are each performed on the corresponding plurality of pieces of image data, a plurality of pieces of first data and eye tracking results (i.e., first screen coordinates) may be generated accordingly.

In operation S330, the controller 150 trains the second model using second data. The second model may be referred to differently as a "calibration model." In this case, the second data is data collected when the user performs the required action using the apparatus 100 and touches and selects (hereinafter referred to as "touch selection") the menu displayed on the display 120. The second data corresponds to training data for training the second model and thus, may be referred to differently as "second training data." Of course, the second model may correspond to a machine learning model that is trained according to the machine learning technique of supervised learning using the second data, which is the second training data.

The second training data is data for training the second model and includes a pair of input data and output data. In particular, upon touch selection, the second data may be generated and collected, and a plurality of pieces of second data may be generated and collected according to touch selections for a plurality of menus. In this case, the second data includes data on actual screen coordinates (hereinafter referred to as "second screen coordinates") on the display 120 for a touch point of the corresponding menu upon touch selection. In this case, the data on the second screen coordinates may correspond to data obtained from the result of performing calibration on the first screen coordinates generated according to the eye tracking in operation S320.

The input data of the second data includes data on the first screen coordinates according to the execution of operations S310 and S320 on the image data related to a touch selection time point. The output data of the second data is a label for the corresponding input data and includes the data on the second screen coordinates according to touch selection. As a result, the output data of the second data includes data obtained from the result of performing the calibration function on the input data of the second data.

In this case, the data on the first screen coordinates included in the input data of the second data may be generated as the results of performing operations S310 and S320 on the image data related to the touch selection time point. In addition, the data on the second screen coordinates included in the output data of the second data may be collected through data detected on the touch screen of the display 120 according to touch selection.

As training according to the machine learning technique is performed using the second data, the second model has a function for a relationship between the input data and the output data of the second data and represents the corresponding function using various parameters. Such a function corresponds to a function that performs the calibration function. That is, the second model may represent a relationship between the first screen coordinates and the second screen coordinates related to the touch selection time point using the parameters of weights and biases.

For example, the machine learning technique applied to train the second model may include an artificial neural network, boosting, Bayesian statistics, a decision tree, Gaussian process regression, a nearest neighbor algorithm, a support vector machine, a random forest, symbolic machine learning, ensembles of classifiers, deep learning, or the like, but is not limited thereto.

In particular, the second model may be a deep learning model trained by a deep learning technique. In this case, the second model represents a relationship between the input data and the output data of the training data as multiple layers, and the multiple representation layers are also referred to as a "neural network." That is, the model may represent the relationship between the input data and the output data of the training data through parameters of multiple hidden layers.

For example, the deep learning technique may include a DNN, a CNN, an RNN, an RBM, a DBN, deep Q-networks, and the like, but is not limited thereto.

The second model trained in this way corresponds to a model that performs a calibration function of correcting the first screen coordinates to the second screen coordinates when performing inference according to operation S340 described below. That is, the second model corresponds to a model that finely adjusts the input first screen coordinates and outputs the first screen coordinates as the calibrated second screen coordinates.

In particular, as the user touches and selects a plurality of menus according to the required action, a plurality of pieces of second data may be generated and collected, and training for the second model may be gradually matured through the plurality of pieces of second data. In particular, the second model may be trained based on the second data collected through the initial selection action. Additionally, the second model may be additionally trained based on the second data collected through the intermediate selection action. As a result, according to the required action in which the user selects various menus multiple times, the second model can continuously optimize the relationship between the first and second screen coordinates and continuously increase the accuracy of the calibration function.

In operation S340, the controller 150 performs the calibration function for eye tracking using the trained second model. That is, the second model continuously trained according to operation S330 may be stored in the memory 140, and the controller 150 may perform inference on the trained second model to perform the calibration function for eye tracking.

When performing such inference, the input data including the data on the first screen coordinates generated according to the continued execution of operations S310 and S320 (in particular, the data on the first screen coordinates generated from the image data captured by the camera 110 at a time other than the touch selection time point or a time other than the time point used as the second data) is input to the second model. As a result, a predicted value of the calibrated second screen coordinate is output from the second model.

That is, while the user uses the apparatus 100, the controller 150 continuously performs operations S310 and S320 on the image data on the user while allowing the camera 110 to continuously capture the user. At this time, the controller 150 inputs the data on the first screen coordinates, which are the result of eye tracking generated by performing operations S310 and S320 on the image data captured by the camera 110 at a time other than the touch selection time point, to the trained second model as input data. Of course, the second model may be continuously trained according to touch selection in operation S330. As a result of the input, the data on the second screen coordinates, which are the result of the calibration for the first screen coordinates, may be output from the second model.

Of course, the second model used in operation S340 is preferably a model trained based on the second data generated and collected according to at least the initial selection action. This is because the second model may have a certain degree of accuracy even when training is performed based on the initial selection action that is necessarily performed.

Of course, additionally, the second model used in operation S340 may be a model additionally trained based on the second data that is generated and collected according to the intermediate selection action. In this case, the corresponding second model may have higher accuracy than a model trained only based on the initial selection action.

Meanwhile, the first model used in operation S320 is a model previously trained based on the first training data and stored in the memory 140. That is, the first model currently stored in the apparatus 100 is a model that has been previously trained based on the first training data on various other users rather than the current user of the apparatus 100. Accordingly, training for the first model may be performed in another device. In this case, the apparatus 100 may store only the first model, which is the result trained based on the first training data, in the memory 140 without storing the first training data.

Of course, training for the first model may also be performed in the apparatus 100. In this case, the controller 150 may store the first training data and the first model, which is the result trained based on the first training data, together in the memory 140 and use the first training data and the first model.

On the other hand, the second model used in operations S330 and S340 is trained using the second data, which is the real-time second training data on the current user using the apparatus 100 and stored in the memory 140. In this case, the second data is collected in real time for each touch selection and used for training the second model. Accordingly, the controller 150 may store the corresponding second data and the second model, which is continuously trained in real time based on the second data, together in the memory 140 and use the second data and the second model.

In operation S350, the controller 150 provides a customized interface for the user of the apparatus 100 through the display 120 using the eye tracking calibrated according to operation S340. That is, the controller 150 provides a customized interface for the user of the apparatus 100 through the display 120 using the second screen coordinates that are calibrated and output according to operation S340.

In this case, the customized interface may include a function of analyzing the eye information of the user according to the second screen coordinates and automatically adjusting and recommending a screen interface according to the analyzed eye information of the user. For example, the customized interface may include highlighting a menu corresponding to the second screen coordinates at which the user repeatedly looks on the display 120 or providing a recommended menu customized to the user on the display 120.

<Differences from the Related Art>

The present disclosure configured as described above innovatively solves various problems that occur in the eye tracking and calibration functions of the related art, maximizes the user's convenience and accessibility, and enables efficient eye tracking. Through the automated calibration according to the present disclosure, the user may use the kiosk according to the apparatus 100 without a complicated setting process, and the accuracy of eye tracking can be gradually increased through training about the second data that is continuously collected in real time according to touch selection. Such technological advancement can significantly improve the user experience of the kiosk and provide a more sophisticated and personalized interface, thereby providing superior effects in comparison to the conventional technology.

The present disclosure provides an innovative approach that fundamentally differs from the eye tracking and calibration functions of the related art. In comparison to the related art that requires separate processes such as pre-information collection of the user and calibration, the present disclosure has differentiated functions of significantly improving the user experience and enhancing convenience of use through automated calibration and eye tracking. Main differences between the present disclosure and the related art are as follows.

<Difference 1: Diversity of User Input and Automatic Training Function>

The eye tracking and calibration functions of the related art require a lot of input from a user, and in particular, the user needs to perform a series of calibration procedures directly when using a kiosk for the first time. This may make the user go through a tedious and cumbersome process and affect subsequent work due to incorrect settings.

On the other hand, in the present disclosure, the user may start using the kiosk without calibration when the user first uses the kiosk. Since a position at which the user touches the display 120 matches his or her eyes, in the present disclosure, data according to a menu which the user touches and selects on the display 120 is collected in real time, and thus calibration that automatically gradually matches the user's eyes with the position on the screen is performed. According to such an automated training process, the screen coordinates for the eye position of the user are corrected, thereby gradually increasing the accuracy of the eye tracking. That is, in the present disclosure, the user can naturally experience the optimal eye tracking environment without separate settings or manipulation.

<Difference 2: Dynamic Calibration for Accurate Eye Tracking>

In the eye tracking technology of the related art, it is difficult to maintain the accuracy of the eye tracking after one-time calibration. For example, when the initial calibration is not performed accurately, subsequent eye tracking may become inaccurate, and when variables such as the user changing his or her posture or looking at the screen differently occur, re-calibration is often required.

However, the present disclosure introduces a dynamic calibration method of continuously training data during the interaction of the user and based on this, adjusting the eyes in real time. That is, eye tracking may be automatically corrected according to the user's behavior or environmental changes, and the user may continuously experience accurate eye tracking without a separate additional process. This enables accurate eye tracking customized to each user, especially when multiple users use the kiosk in public places.

<Difference 3: Providing Customized User Experience and Personalized Interface>

The eye tracking systems of the related art tend to apply the same calibration value to all users. This does not sufficiently reflect the physical differences of each user, which reduces the accuracy of the eye tracking.

On the other hand, the present disclosure implements a technology of continuously training and adapting personalized calibration data (i.e., second data) to provide a customized user experience. For example, when the user uses a kiosk, there may be a certain error at first, but calibration is gradually performed according to the user based on the touch selection of the user, such as touching a specific menu on a screen. Calibration performed adaptively in this way may reflect the physical characteristics and behavioral patterns of each user and provide more accurate eye tracking and a personalized interface.

<Difference 4: Lowering Technical Barriers and Improving User Accessibility>

The related art requires expert-level technical understanding, or users need to be at least sufficiently familiar with a calibration process. This is a great burden to users who are not familiar with the technology, and such complexity is particularly highlighted as a problem in public systems such as a kiosk.

On the other hand, the present disclosure is designed to lower such technical barriers. Through the automated calibration and eye tracking, users may use the apparatus 100 without a separate training or setting process, and even users with low technical understanding can easily access the apparatus 100. This is an important differentiator in a kiosk system that is accessed by a large number of unspecified users in public places.

In conclusion, the present disclosure proposes a fundamentally different approach from the eye tracking and calibration technology of the related art and greatly improves user convenience and efficiency through automated training, dynamic calibration, and a customized user experience. This enables more accurate and flexible eye tracking in various usage environments and further improves the quality of user experience.

The present disclosure configured as described above provides real-time eye tracking and calibration functions in a kiosk and has advantages of being user-friendly, minimizing inconvenience in a calibration process, and continuously providing accurate real-time eye tracking.

In addition, the present disclosure has advantages of innovatively improving the user experience and providing a very high level of accuracy and user convenience in comparison to the related art through unique functions of eye tracking and an automated calibration system. The main effects of the present disclosure are as follows.

1. Providing Customized User Interface

The present disclosure can provide a customized personalized interface by adapting an automatic calibration method that is gradually customized to a user without separate complex manipulation of the user. In the related art, consistent settings are applied equally to all users, making it impossible to provide a personalized user experience. However, according to the present disclosure, data according to the user's touch selection is collected while the user interacts with a kiosk so that eye tracking is gradually adjusted according to the individual characteristics of the user. Accordingly, each user can experience an interface optimized for him/herself, and this customized experience acts as an important factor that greatly improves user convenience.

2. Ease of Use and Improved Accessibility

The present disclosure allows users to use the kiosk immediately without separate complicated settings or an initial calibration procedure. That is, the users can naturally interact with the kiosk from the moment they first encounter the kiosk according to the present disclosure, and the accuracy of eye tracking automatically increases as the user uses the kiosk. In this process, the user does not need separate training or additional manipulation, and the kiosk is optimized by itself. This provides advantages of preventing general users who use the kiosk, in particular, in public places from experiencing technical difficulties and allowing users of various ages and skill levels to easily access and use the kiosk.

3. Providing Accurate and Diverse Selection Possibilities

The present disclosure does not rely on simple fixed settings in relation to eye tracking, but provides optimal eye tracking accuracy in various usage environments through dynamic calibration that reflects the user's real-time interaction data. Even when the user's eye is accurately tracked initially, the eyes can be tracked with high accuracy later through gradual training. In addition, training is performed every time the user touches and selects a specific menu, and the detail and accuracy of eye tracking are gradually improved according to the method desired by each user. This can provide a better user experience and a more accurate and diverse range of selections in comparison to the related art.

4. Time and Cost Saving Effects

According to the present disclosure, it is possible to significantly save the time and cost of users and operators by eliminating a cumbersome pre-setting process required in the past through an automated calibration system. In the related art, the user needs to perform initial calibration every time, which is particularly inefficient in public places where the same system is applied to multiple users. According to the present disclosure, it is possible to overcome such inefficiency through a process of collecting data in real time and automatically performing training and allow the user to use the kiosk immediately. This reduces installation and maintenance costs, and also brings about a very effective saving effect in terms of the system operation.

5. Providing Improved User Experience Through Continuous System Improvement

The present disclosure is designed to have a structure that can be continuously updated and improved. That is, the present disclosure has an automatic training function of collecting data on users in real time and gradually increasing the accuracy of eye tracking and calibration accordingly. In particular, it is possible to continuously improve the user experience by analyzing and correcting errors in user eye tracking, malfunctions of the system, or the like in real time. In addition, based on such data, the operator can develop additional functions capable of providing a better user experience, and continuous improvements that reflect the user's feedback are made. Accordingly, the present disclosure can provide a more sophisticated and user-friendly experience over time.

The effects obtainable from the present disclosure are not limited to the above-described effects, and other effects that are not mentioned will be able to be clearly understood by those skilled in the art to which the present disclosure pertains from the following description.

In the detailed description of the present disclosure, specific embodiments have been described, but it is apparent that various modifications are possible without departing from the scope of the present disclosure. Therefore, the scope of the present disclosure is limited to the described embodiments and should be determined by the appended claims and their equivalents.

The invention claimed is:

1. A method performed by a kiosk including a display having a touch screen, comprising:

collecting first data related to a user's appearance based on image data on the user acquired from a camera of the kiosk;

generating first screen coordinates of the display corresponding to the user's eyes based on the first data and performing eye tracking on the user;

collecting second data including second screen coordinates for a corresponding touch point detected when the user touches and selects a menu displayed on the display and training a calibration model, which is a machine learning model, using the collected second data; and performing inference on the calibration model using the first screen coordinates according to the eye tracking performed at a time other than a touch selection time point to perform calibration on the eye tracking, wherein the training of the calibration model includes collecting the second data according to touch selection performed upon a required action in which the user purchases a ticket or places an order using the kiosk, wherein the required action includes an initial selection action in which the user who intends to use the kiosk initially selects an initial menu displayed on the display, and an intermediate selection action in which the user selects detailed menus displayed on the display to select detailed items of a desired ticket or order after the initial selection action, and wherein the training of the calibration model includes gradually training the calibration model using a plurality of pieces of second data collected according to touch selections on a plurality of menus.

2. The method of claim 1, wherein the first data includes data on a position, facial pose, and distance of the user.

3. The method of claim 1, wherein the performing of the eye tracking is performed using an eye tracking model, which is a machine learning model, and when the first data is input, the eye tracking model is a model trained to output the first screen coordinates corresponding to the first data.

4. The method of claim 1, wherein, when the first screen coordinates are input, the calibration model is a model trained to output the second screen coordinates, which are a result of calibrating the first screen coordinates.

5. The method of claim 1, further comprising providing a customized interface for the user through the display using the calibrated second screen coordinates.

6. The method of claim 5, wherein the customized interface provides functions of analyzing eye information of the user according to the calibrated second screen coordinates and adjusting or recommending a screen interface.

7. An apparatus related to a kiosk, comprising:

a camera configured to acquire image data on a user of the kiosk;

a display comprising a touch screen; and a controller configured to provide a function of the kiosk using the image data, wherein the controller is configured to:

collect first data related to the user's appearance based on the image data;

generate first screen coordinates of the display corresponding to the user's eyes based on the first data and perform eye tracking on the user;

collect second data including second screen coordinates for a corresponding touch point detected when the user touches and selects a menu displayed on the display and train a calibration model, which is a machine learning model, using the collected second data; and perform inference on the calibration model using the first screen coordinates according to the eye tracking performed at a time other than a touch selection time point to perform calibration on the eye tracking, wherein the controller is configured to collect the second data according to touch selection performed upon a required action in which the user purchases a ticket or places an order using the kiosk when performing the calibration, wherein the required action includes an initial selection action in which the user who intends to use the kiosk initially selects an initial menu displayed on the display and an intermediate selection action in which the user selects detailed menus displayed on the display to select detailed items of a desired ticket or order after the initial selection action, and wherein the controller is configured to gradually train the calibration model using a plurality of pieces of second data collected according to touch selections for a plurality of menus in the initial selection action and the intermediate selection action.

8. The apparatus of claim 7, wherein the controller is configured to use the first data including data on a position, facial pose, and distance of the user.

9. The apparatus of claim 7, wherein, when receiving the first data, the controller is configured to perform the eye tracking using an eye tracking model, which is a machine learning model trained to output the first screen coordinates corresponding to the first data.

10. The apparatus of claim 7, wherein, when receiving the first screen coordinates, the controller is configured to use the calibration model trained to output the second screen coordinates, which are a result of calibrating the first screen coordinates.

11. The apparatus of claim 7, wherein the controller is configured to provide a customized interface for the user through the display using the calibrated second screen coordinates.

12. The apparatus of claim 11, wherein the controller is configured to provide the customized interface by providing functions of analyzing eye information of the user according to the calibrated second screen coordinates and adjusting or recommending a screen interface.

* * * * *